UNITED STATES PATENT OFFICE.

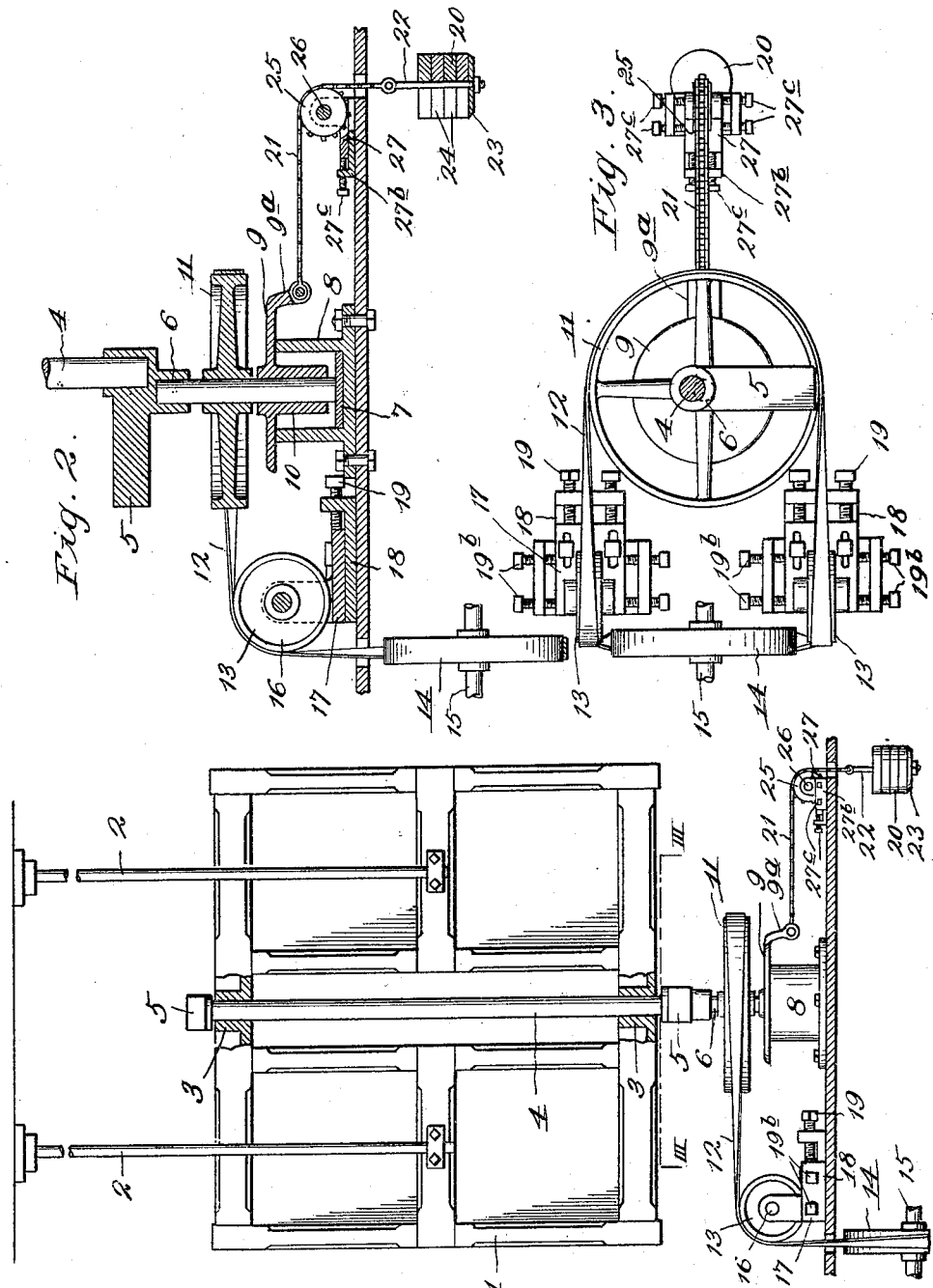

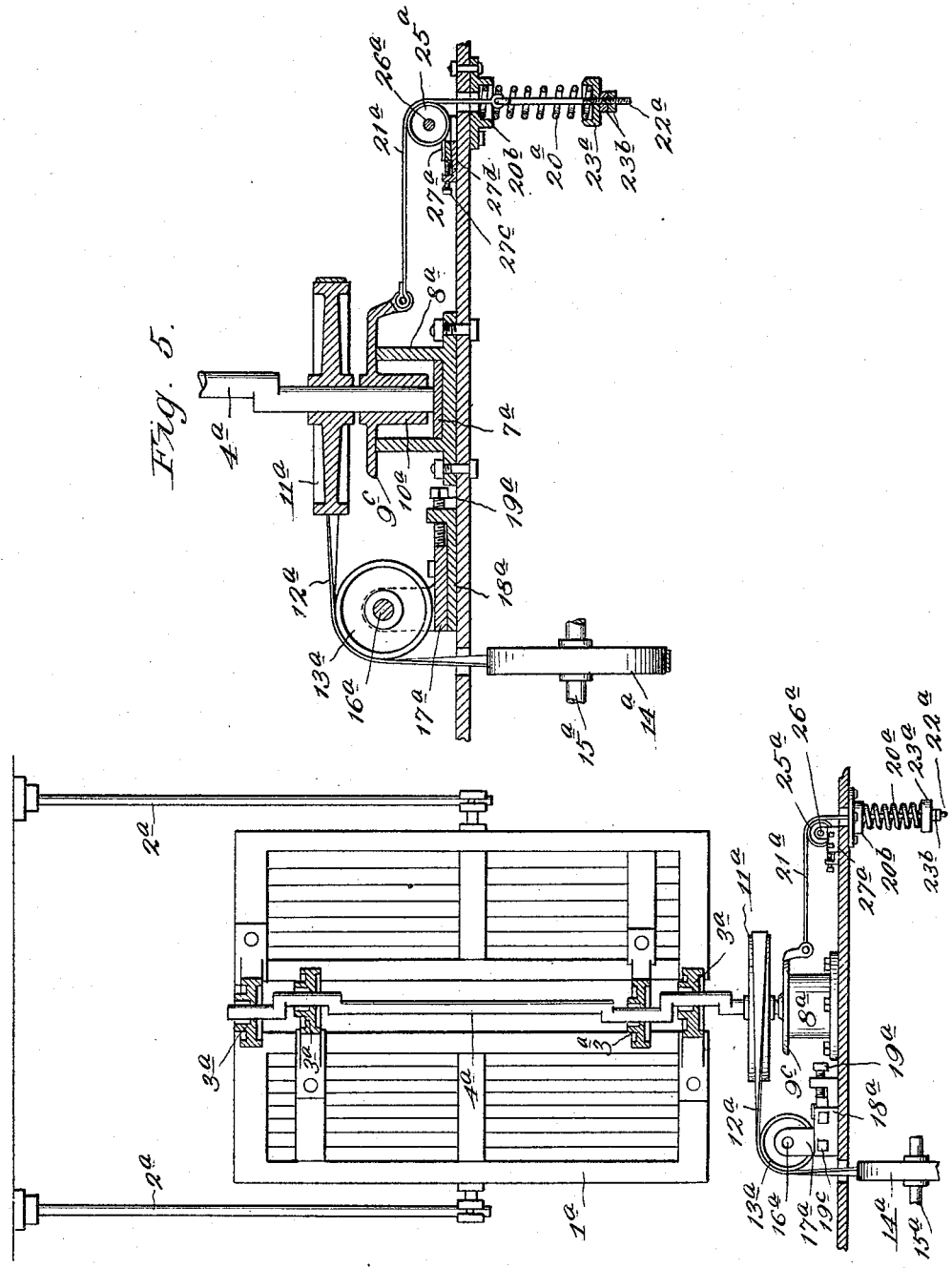

GEORGE W. COMBS, OF LEAVENWORTH, KANSAS.

GYRATORY STRUCTURE.

1,123,170.   Specification of Letters Patent.   Patented Dec. 29, 1914.

Application filed March 4, 1910. Serial No. 547,348.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

This invention relates to improvements in self-balancing gyratory structure, such as flour sifters, screeners, bolters, sorting machines, etc., and the present invention relates more particularly to means for controlling or restraining the structure from abnormal throw.

In the accompanying drawings, which illustrate the invention: Figure 1 is a side elevation partly in section of a sifter structure provided with my improvements. Fig. 2 is an enlarged vertical section of means for driving and restraining the structure. Fig. 3 is a horizontal section on line III—III of Fig. 1. Fig. 4 is a vertical section of a modified form of structure and restraining means, and Fig. 5 is an enlarged vertical section of the driving and restraining means shown in Fig. 4.

Referring particularly to Figs. 1 to 3, inclusive, 1 designates a sifter structure, suspended by flexible rods 2, and provided with centrally-disposed bearings 3 in which a vertically-positioned shaft 4 is journaled for actuating said structure. Shaft 4 is provided with two eccentrically-mounted weights 5, and an eccentric-pin 6, which latter extends downward and is supported by a step-bearing 7 in a lubricant chamber 8. Chamber 8 is normally closed at its upper end by a lid 9 movable laterally thereon and provided with a depending integral sleeve 10 loosely-embracing pin 6, so that the latter may rotate therein.

11 designates a driver fixed to pin 6 and driven by an endless belt 12 running from said driver over a pair of idlers 13 and downward to a stationary pulley 14 fixed to a journaled shaft 15. Idlers 13 are mounted upon shafts 16 carried by brackets 17 adjustably-secured to base-plates 18, provided with set-screws 19 abutting against the brackets to adjust the latter backward or forward for the purpose of tensioning the endless belt 12, which not only actuates the driver 11 but also assists in holding the structure to its true gyratory course. This adjustment of the brackets also permits the eccentric-pin 6 to be adjusted centrally within the lubricant chamber. Base-plates 18, also, are provided with set-screws 19$^b$ to adjust the brackets laterally.

Belt 12 is assisted in restraining the structure from abnormal throw by coacting means consisting, preferably, of counterweights 20, and a flexible member 21 attached at one end to lid 9 and at its opposite end to a rod 22 provided at its lower end with a disk 23 upon which the counterweights 20 are mounted, said counterweights being slotted at 24 so that as many as desired may be readily added to said rod, the object being to get substantially the same tension on flexible member 21 as on the endless belt 12, so that both will act with equal force in opposite directions upon the structure and thus tend to hold the same in its true gyratory course. Lid 9 has a lug 9$^a$ extending downward to a horizontal plane midway between the ends of sleeve 10 so that the pull of member 21, which is attached directly to the lug, will not have a tendency to tip sleeve 10 and cause it to bear with greater pressure at one end than the other upon pin 6.

Member 21 consists preferably of rigid links, yieldingly-connected so that they may travel freely over a rotary member or sprocket-wheel 25 mounted upon a pin 26, extending through a bracket 27, mounted upon a base-plate 27$^b$ provided with set-screws 27$^c$, to adjust the bracket 27.

In practice, the two flexible members 12 and 21 pull in opposite directions to each other, and thus tend to hold pin 6 from lateral or orbital movement, although, said members will yield and permit lateral movement in any direction should the structure 1, for any reason, leave its true gyratory course, and consequently no vibration will be imparted to the building containing the structure. Should one of the flexible members in time stretch more than its companion, and thus permit pin 6 to be drawn to one side of the lubricant chamber, said pin can be readily restored to the center of the chamber by proper manipulation of the set-screws 19.

In the modified form shown in Figs. 4 and 5, the construction and operation of the parts is the same as that shown in the preferred form, with few exceptions, which will be pointed out in the following description: 1$^a$ designates a four-box sifter structure of the type disclosed by U. S. Letters Patent No. 12,894 (Reissue). Structure 1ª is supported by flexible rods 2ª and provided with centrally-disposed bearings 3ª, upon which a crank-shaft 4ª is journaled for actuating the structure 1ª. The lower end of shaft 4ª rests upon a step-bearing 7ª in a lubricant-chamber 8ª, normally closed by a lid 9ᶜ to exclude dust therefrom, said lid having an integral sleeve 10ª, loosely embracing the lower portion of shaft 4ª. 11ª designates a driver fixed to the lower portion of shaft 4ª and driven by an endless flexible member or belt 12ª, running over idlers 13ª to a stationary pulley 14ª mounted upon a driven shaft 15ª. Idlers 13ª are mounted upon shafts 16ª carried by brackets 17ª adjustably mounted upon base-plates 18ª, provided with set-screws 19ª abutting against the brackets for the purpose of adjusting the same and the idlers backward or forward to tension the endless member 12ª. Base-plates 18ª are also provided with set-screws 19ᶜ to adjust the brackets 17ª laterally. 20ª designates a pressure-exerting member or expansion spring for pulling upon a flexible member or belt 21ª attached at one end to lid 9ᶜ and at its opposite end to a rod 22ª, provided at its lower threaded end with disk 23ª, which may be adjusted up or down upon the rod to tension member 20ª, said disk being locked at any point of its adjustment by jam-nuts 23ᵇ. The upper end of member 20ª is seated in a cup 20ᵇ to prevent lateral movement thereof. 25ª designates an idler over which the flexible member 21ª operates, said idler being mounted upon a pin 26ª, carried by a bracket 27ª, mounted upon a base-plate 27ᵈ, provided with set-screws 27ᶜ to adjust the bracket 27ª.

As above described, the construction and operation of the modified form is substantially the same as that of the preferred form, except that member 20ª has the additional advantage over member 20 of increasing its resistance to lateral movement of the shaft 4ª in proportion to the extent of said lateral movement, whereas the resistance offered by the counterweights 20 is the same irrespective of the extent of said lateral movement.

Having thus described my invention, what I claim is:—

1. In combination, a normally-gyratable structure, endless means to drive and steady the same, and yielding weighted means coacting with the first-mentioned means in steadying the structure.

2. In combination, a freely-supported structure adapted to move laterally in any direction, flexible endless driving means capable of lateral movement with said structure, and constant resisting means coacting with said flexible means to restrain the structure from abnormal lateral movement.

3. In combination, a gyratory structure, a member coacting therewith to steady the same comprising individually-rigid collectively-yielding means, said member being weighted at one end, and rotary means from which said weighted end movably depends.

4. In combination, a structure, means whereby the same is yieldingly-supported for lateral movement in any direction, means for actuating said structure, a sprocket-chain operatively-connected at one end to the structure, a counterweight at the opposite end of said sprocket-chain to resist abnormal lateral movement of the structure, and a sprocket-wheel over which the sprocket-chain runs.

5. In combination, a gyratory structure, means to prevent rotation of the same, a steadying device for said structure embodying weighted flexible means movable into different horizontal planes, and a rotary member over which said steadying device travels.

6. In combination, a freely-supported structure having centrally-disposed bearings, a rotary shaft mounted in said bearings for actuating the structure, a sleeve loosely-embracing said shaft, and weighted lunge restraining means operatively-coacting with said sleeve to hold the structure in its regular path of travel.

7. In combination, a structure, means freely-supporting the same, an eccentrically-weighted shaft for actuating said structure, and flexible weighted means coacting with said shaft to steady the structure when in operation.

8. In combination, a gyratory structure, a shaft journaled therein for actuating the same, means independent of the structure for supporting the weight of the shaft, and flexible restraining means coacting with the shaft to steady the structure while in operation.

9. In combination, a normally-gyratable body, a shaft centrally arranged within said body for actuating the same and capable of orbital movement therewith, a lubricant-chamber into which the lower end of said shaft extends and over the bottom of which it is adapted to move, a lid for said lubricant-chamber loosely-embracing the shaft but adapted to move orbitally therewith, and yielding restraining means coacting with said lid to hold the body from abnormal movement.

10. In combination, a structure, means whereby the same is yieldingly supported, a gyrator for said structure, a flexible restraining member operatively-connected to the structure to hold the same from abnormal movement, a rotary member over which said flexible member travels, a rod connected to the free end of the flexible member, slotted weights removably placed in position upon said rod to coöperate with the flexible member in steadying the structure, and means carried by the rod for supporting said weights.

11. In combination, a freely-supported structure capable of lateral movement in any direction, a pulley for actuating said structure capable of lateral movement therewith, an endless member for driving said pulley and tending to restrain the same from lateral movement, and means having vertical movement and coacting with said endless member in restraining the pulley from lateral movement.

12. In combination, a gyratory structure, a driver therefor capable of orbital movement, an endless member for actuating said driver and tending to restrain the same from orbital movement, means for tensioning said endless member, a stationary pulley for actuating said member, and a flexible weighted member coöperating with the endless member in tending to restrain the driver from orbital movement.

13. In combination, a gyratory structure, yielding power transmission devices for driving the structure and tending to restrain the same from abnormal gyration; and weighted flexible restraining means coacting with said yielding power transmission devices in holding the structure in its true gyratory path.

14. In combination, a gyratory body, a vertically-positioned eccentrically-weighted shaft therein for actuating the same, an eccentric-pin fixed to said shaft and capable of lateral movement in any direction, yielding power transmission devices for driving said pin and tending to restrain the same from lateral movement, idlers for guiding and tensioning said power transmission devices, and weighted flexible restraining means coacting with the yielding power transmission devices in steadying the pin from lateral movement while in operation.

15. In combination, a freely-supported structure, a shaft for actuating the same, a lubricant chamber into which said shaft extends, and flexible normally stationary means for adjusting said shaft centrally within the lubricant chamber.

16. In combination, a normally-gyratable structure, means to drive and steady the same, and a member coacting with said means to steady the structure comprising individually-rigid collectively-yielding elements.

17. In combination, a structure, means whereby the same is yieldingly-supported for lateral movement in any direction, a flexible member to drive and steady the structure, a sprocket-chain coacting with said flexible member in steadying the structure, and yielding resisting means coacting with said sprocket-chain.

18. In combination, a gyratory structure, yielding power transmission devices for driving said structure and tending to restrain the same from abnormal gyration, restraining means including a flexible member coacting with said power transmission devices, and a rotary member over which said flexible member is adapted to travel.

In testimony whereof I affix my signature, in the presence of two witnesses.

GEORGE W. COMBS.

Witnesses:
F. G. FISCHER,
M. COX.

Copies of this patent may be obtained for five cents each, by addressing the "Commissioner of Patents, Washington, D. C."